Feb. 2, 1932.  J. S. WRIGHT  1,843,353
STAR WHEEL
Original Filed June 16, 1928  2 Sheets-Sheet 1
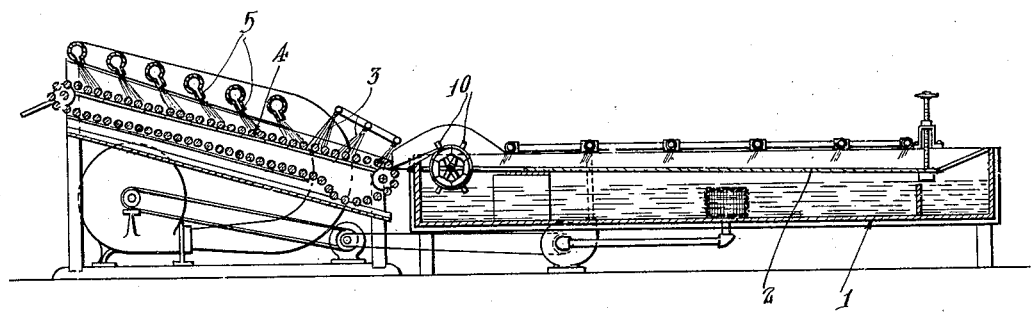
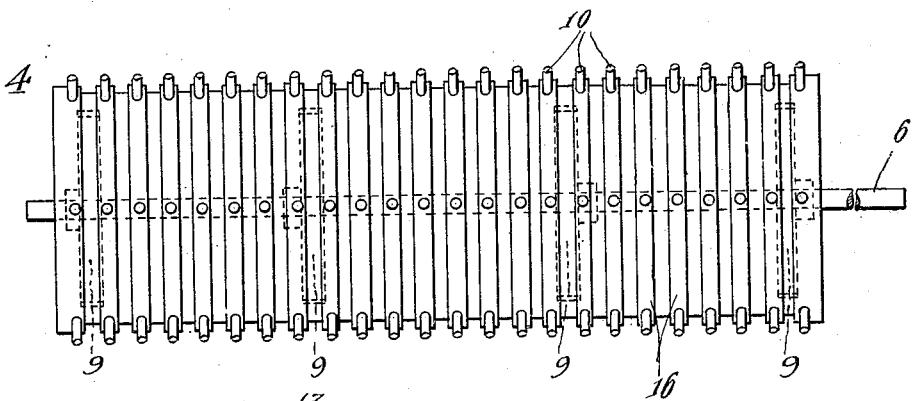
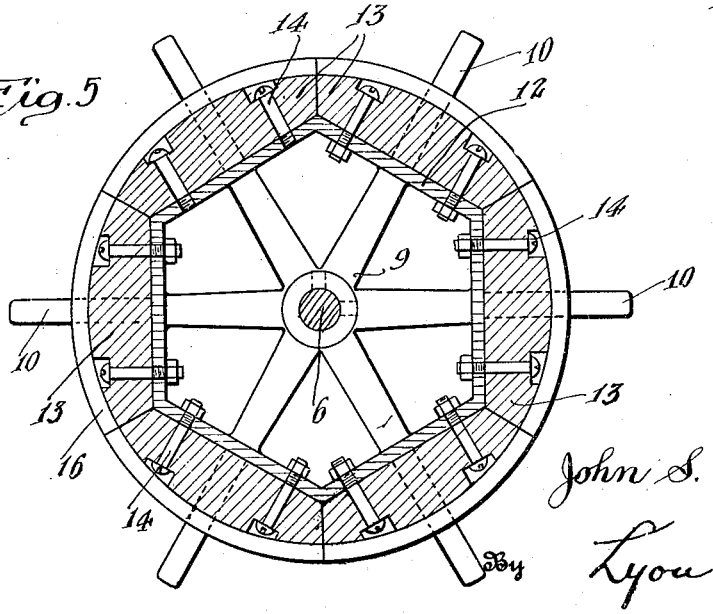
Inventor
John S. Wright
By Lyon & Lyon
Attorneys Feb. 2, 1932.   J. S. WRIGHT   1,843,353
STAR WHEEL
Original Filed June 16, 1928   2 Sheets-Sheet 2

Inventor
John S. Wright
By Lyon & Lyon
Attorney

Patented Feb. 2, 1932

1,843,353

UNITED STATES PATENT OFFICE

JOHN S. WRIGHT, OF RIVERSIDE, CALIFORNIA, ASSIGNOR TO STEBLER-PARKER CO., OF RIVERSIDE, CALIFORNIA, A CORPORATION OF CALIFORNIA

STAR WHEEL

Application filed June 16, 1928, Serial No. 286,039. Renewed August 31, 1929.

This invention relates to star wheels, and is more particularly related to a device adapted for use in extracting fruit or the like from a tank containing a cleansing or like solution in a manner to prevent the fruit from becoming scarred or marred as the same is lifted from the solution tank and delivered to a drying means or the like.

In the handling of fruit, particularly fruit having delicate skins such, for example, apples, pears, plums and the like, it is essential that the means for handling the fruit be so designed and constructed as to cause a minimum of abrasion of the skin of the fruit and in such a manner as not to cause the fruit to be impacted against sharp edges or the like.

In the copending application of Fred Stebler for method of and means for washing fruit, filed July 5, 1927, Serial No. 203,370, there is illustrated the fruit washing apparatus including a washing tank for washing pears, apples or other fruit, by the means of a washing solution, the fruit being propelled through the washing solution in a partially submerged position, and in this application there is illustrated a form of star wheel for extracting the fruit from the solution tank and delivering the same to a rinsing and drying mechanism.

The present invention is primarily addressed to an improved form of extractor means for extracting the fruit from a solution or washing tank in such a manner as to prevent abrasion of the skin of the fruit, and for delivering the fruit to a rinsing, drying or other treating mechanism.

It is an object of this invention to provide an extracting mechanism which forms a plurality of arcuate or circular paths of predetermined width corresponding to the size of the fruit, through which the fruit is caused to travel as extracted from the solution tank or similar fruit treating means, the fruit being adapted to ride in the paths in predetermined position and to be moved into the paths by means of extractor fingers and to be delivered from the extractor means by means which are operable in connection with the extractor means and which latter means provide a continuous flat runway upon which the fruit is delivered from the paths at a point near the apex of the circular path traveled by the fruit in the extractor means in such a manner that abrasion of the fruit as extracted from the cleaning mechanism and delivered therefrom by the extractor mechanism is prevented.

Other objects and advantages of this invention it is believed will be apparent from the following detailed description of a preferred embodiment thereof as illustrated in the accompanying drawings.

In the drawings:

Figure 1 is a side elevation partially in vertical section of a fruit washing apparatus illustrating extractor means embodying this invention as embodied therein.

Fig. 4 is a top plan view of the star wheel.

Fig. 5 is a sectional end elevation of the star wheel illustrating the parts in detail.

Figure 2:
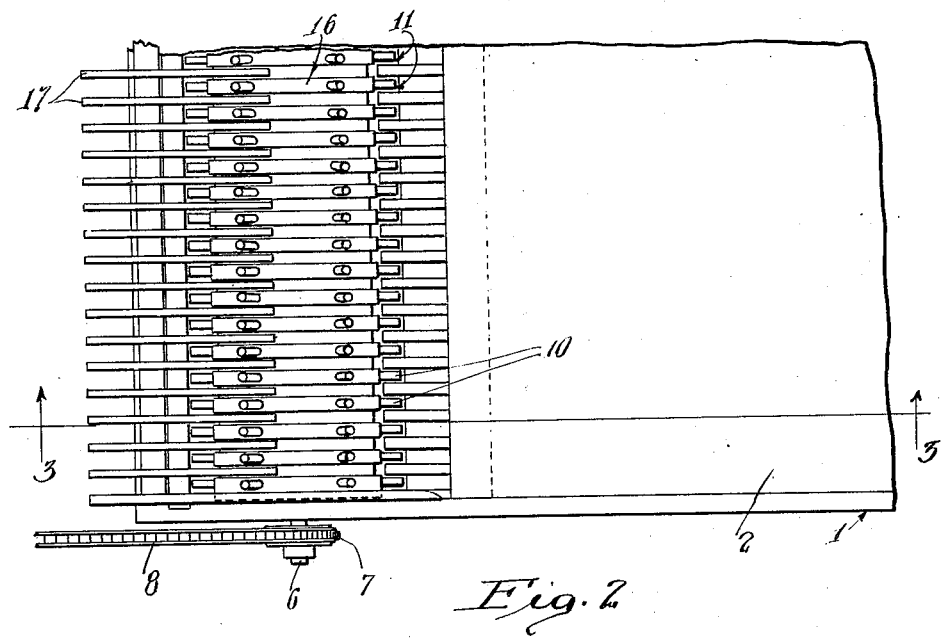
Figure 2 is a top plan view of the star wheel mechanism embodying this invention illustrating the same as in position with a fragment of the table and washing tank.
Figure 3:
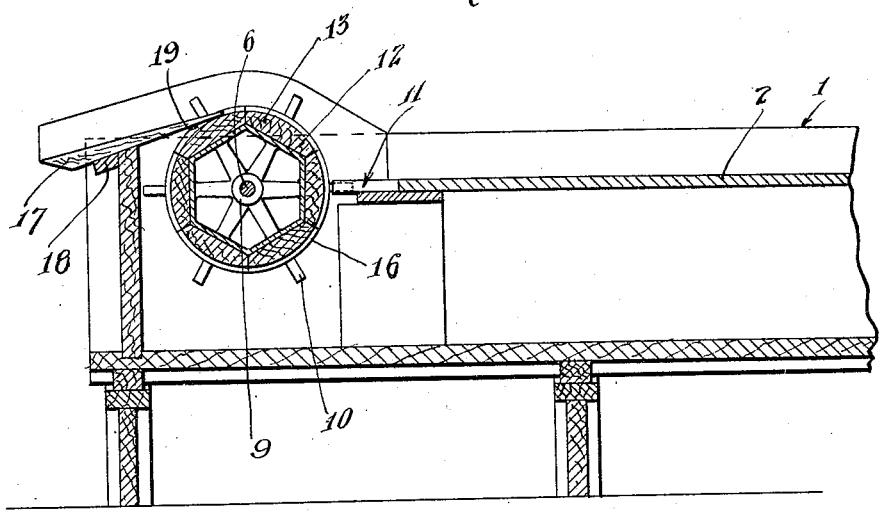
Figure 3 is a sectional end elevation of the star wheel embodying this invention taken substantially on the line 3—3 of Figure 2.

In the preferred embodiment of this invention as illustrated in the accompanying drawings, 1 indicates a solution tank which contains water or a chemical washing solution for washing fruit and supported within the tank 1 is a table 2 over which the fruit is propelled by any suitable or desirable means such, for example, as by the setting up of a current in the washing solution within the tank 1, as is specifically disclosed in the Fred Stebler application, Serial No. 203,370 heretofore referred to.

After the fruit has reached the end of the table 2, it is desired to lift the fruit from off the table 2 and convey the same up to a position where the same may roll by gravity into the rinsing and drying apparatus illustrated by the rinsing sprays 3, from which spray water is sprayed on to the fruit as the same travels over the conveyor 4. After leaving the sprays 3 the fruit is contacted by air jetted from the jets 5 to dry the fruit. The means for extracting the fruit from the wash tank 1 and delivering the same to the rinsing and drying apparatus is preferably of the following construction:

The means for advancing the fruit from the wash tank 1 includes a star wheel having a plurality of radial fingers and co-operating with means for guiding the fruit so that the fingers of the star wheel engage the fruit on one side of the axis of rotation of the star wheel and deliver the fruit on the other side of its axis.

Journaled in bearings supported at the opposite sides of the tank 1 is a shaft 6. The shaft 6 is driven from any suitable or desirable source such, for example, as through a sprocket 7 driven by a chain 8 from any suitable form of prime mover. Secured to the shaft 6 at equally spaced intervals along its length are hubs 9 on which extractor fingers are positioned along the shaft 6 so that the same will pass through slots 11 formed in the end of the table 2 in such a manner that two adjacent fingers 10 will lift the fruit off from the end of the table 2 freely, in a manner to prevent the bruising of the skin of the fruit.

In order to provide a star wheel presenting a plane surface over which the fruit will travel, there is formed a solid wheel of cylindrical shape by securing to or forming integral with the fingers 10 a rim 12 to which segmental blocks 13 are secured by means of bolts 14.

Guiding means is provided to cooperate with the fingers 10 of the star wheel, to keep each fruit in alignment with the finger that advances it. For this purpose, in the present instance the segmental blocks are formed in such a manner as to provide circular rims 16 which extend radially outward from the periphery of the wheel, and these rims 16 are spaced apart a distance so that the fruit as picked from the tank 1 will rest, and ride, on two of these adjacent rims 16 but will not extend down sufficiently to engage the "flat" cylindrical surface of the wheel, the spacing of the rims 16 being less than the diameter of the smallest fruit to be passed through the washing tank 1 and picked fom the washing tank by means of the fingers 10. Each pair of rims 16 cooperates with the star wheel between them and keeps the fruit aligned with the fingers of the star wheel.

In order to deliver the fruit from the wheel in a manner to prevent the skin of the fruit being marred, there is provided a multiplicity of extractor bars or slats 17 which are secured in position at the end of the tank 1 as illustrated at 18 so that their beveled ends 19 extend between the rims 16 to a position below the normal point of contact of the fruit when riding on the slats 17 so that the fruit when thus riding will pass on to the slats 17 without being forced against the ends of the slats 17 to mar or scar the skin of the fruit. The slats 17 are mounted so that they extend between the rims 16 at approximately the highest point reached by the fruit when passing over the path defined by the star wheel, or at a point near the apex of the travel of the fruit as the same is extracted from the washing tank 1. The fruit travels by gravity down the slats 17 on to the conveyor 4 and is by the conveyor 4 propelled under the sprays 3 and 5 to rinse and wash the fruit.

It will be obvious from the foregoing that by the construction as specifically set forth in the foregoing specification that a star wheel may be formed of any desired length to be used in a tank 1 of any width by merely spacing the hubs 9 along the shaft 6 with the extractor fingers 10 in position to fit within the slots 11 formed in the table 2, and then positioning the segmental blocks 13 on the rims 12, securing the blocks in position by the bolts 14 and cutting the blocks to the required length to permit the star wheel formed to fit into the tank 1.

Having fully described my invention, it is to be understood that I do not wish to be limited to the details herein set forth, but my invention is of the full scope of the appended claims.

I claim:

1. In a device of the class described, the combination of a shaft, a wheel mounted on the shaft, a plurality of rims spaced longitudinally of the shaft providing troughs on the periphery of the wheel, and fixedly supported lift fingers spaced around the periphery of the wheel and extending from said rims.

2. In a device of the class described, the combination of a shaft, means for driving the shaft, a wheel secured to the shaft, rims secured to the periphery of the wheel and spaced apart longitudinally thereof to provide grooves in the surface of the wheel, fingers extending from said rims, and gravity runways including extractor fingers operatively connected with said device with extractor fingers extending into the grooves to provide a plane surface over which the articles picked up by said fingers will run as delivered from said fingers.

3. The combination with a fruit washing device, including a tank of an extracting mechanism for extracting thin skinned fruit from said tank, the extracting mechanism including a shaft, means for guiding the shaft means formed longitudinally of the shaft providing spaced fruit guideways of less width than the diameter of the fruit being washed, extractor fingers extending from the latter said means, and gravity guideways operatively connected with the said runways and providing extractor fingers which fit within the said grooves below the point of surface contact of the fruit with said guideway-forming means.

4. The combination with a fruit washing device, including a tank of a star wheel including a shaft, means for driving the shaft, spaced fingers extending outwardly from said shaft, means through which the spaced fingers extend providing narrow runways for the fruit extracted from said tank by said fingers, and extractor means for extracting the fruit from the said star wheel including fingers extending into said runways below the point of contact of the fruit on said runways.

5. The combination with a fruit washing mechanism of an extractor including a plurality of circular paths of predetermined width, means for extracting fruit from the tank and placing said fruit in said paths, and means operable in connection with said extractor means to provide a continuous flat runway on to which the fruit is delivered from said paths.

6. In combination with a fruit washing or handling mechanism including a tank containing a washing or treating solution, of an extractor including a plurality of means defining arcuate paths of predetermined width, means operably connected with said path defining means for extracting and elevating fruit from said tank and placing said fruit in said path defining means, and means cooperating with said extractor and extending to a point substantially level with the lower face of said fruit at its high point in its path of travel and providing gravity runs on to which the fruit is delivered from said extractor.

7. In a device of the class described, the combination of a shaft, radially projecting fingers projecting from the shaft and spaced apart longitudinally on said shaft, rims connecting said fingers in circular rows and providing spaced runways, and extractor means extending into said runways at points near their apexes and providing paths substantially tangentially from said runways.

8. In a device of the class described, the combination of a shaft, a plurality of hubs secured in spaced relation along said shaft, extractor fingers extending radially from said hubs, rims formed between said extractor fingers, and segmental blocks secured to said rims.

9. In apparatus of the kind described, the combination of a rotatable star wheel having a plurality of fixedly mounted substantially radial fingers, and guide means co-operating with the said fingers to guide the fruit and advance the same from one side of the axis of rotation of the star wheel to the other side, to cause the fruit to move in parallel planes.

10. In apparatus of the kind described, the combination of a rotatable star wheel having a plurality of fixedly mounted substantially radial fingers for engaging the fruit, and means co-operating with the fingers to raise and advance the fruit, to cause the fruit to move in parallel planes.

11. In apparatus of the kind described, the combination of a rotatable star wheel having a plurality of substantially radial fingers rigidly mounted on the star wheel, and guide means cooperating with the said fingers to guide the fruit and advance the same from one side of the axis of rotation of the star wheel to the other side, to cause the fruit to move in parallel planes.

12. In apparatus of the kind described, the combination of a rotary star wheel having a plurality of substantially radial fingers for lifting the fruit and carrying the same upwardly and over the axis of rotation of the star wheel, and means including members lying adjacent to the face of the star wheel on each side of the paths of the fingers and operating to receive the fruit from the fingers to cause the fruit to move in parallel planes.

13. In apparatus of the kind described, the combination of a table with slots therein at its end, a star wheel mounted to rotate at the end of the table and having outwardly projecting fingers that pass upwardly through the slots when the star wheel rotates and operating to raise fruit lying on the end of the table, and means located on the side of the star wheel remote from the table including members lying on opposite sides of the path of the fingers for receiving the fruit from the same.

14. In combination with a fruit washing or handling apparatus including a tank containing a washing or treating solution, an extractor including a plurality of means defining paths of predetermined width, means operatively connected with said path defining means for extracting and elevating fruit from said tank and placing said fruit in said path defining means, and means co-operating with said extractor for delivering fruit thereto at a suitable point and level relative thereto to permit its being extracted from the solution and elevated and discharged at a suitable point thereabove for delivery from the tank.

Signed at Riverside, Calif., this 9th day of June, 1928.

JOHN S. WRIGHT.